United States Patent Office 2,991,315
Patented July 4, 1961

2,991,315
METHOD OF NITRATING TERMINAL NITROMETHYL GROUPS
Charles W. Plummer, Norwell, Mass., assignor, by mesne assignments, to the United States of America as represented by the Secretary of the Navy
No Drawing. Filed Aug. 15, 1956, Ser. No. 604,288
13 Claims. (Cl. 260—644)

This invention relates to a new method for further nitrating terminal nitromethyl groups of nitroalkanes.

The invention involves the nitration of 1-nitro- and 1,1-dinitroalkanes to 1,1-dinitro and 1,1,1-trinitroalkanes, respectively. It comprises reacting the 1-nitro- and 1,1-dinitroalkanes with tetranitromethane in an alcoholic medium in the presence of a strongly basic alkali metal compound. A modification includes the use of an aqueous alcoholic medium. The preferred alcohol for the medium is methyl alcohol. For the nitration of 1-nitroalkanes the use of sodium methylate as the strongly basic alkali metal compound is preferred.

Briefly, the preferred process consists in dissolving a 1-nitroalkane or a substituted 1-nitroalkane or a 1,1-dinitroalkane or a substituted 1,1-dinitroalkane in methanol or aqueous methanol and adding to the solution formed a solution of a basic metal compound in water, methanol or aqueous methanol. This procedure results in the formation of anions represented by the following structure: $[R-CHNO_2]^-$ and $[R-C(NO_2)_2]^-$ wherein R is defined as an alkyl group or a substituted alkyl group. Tetranitromethane is added to the above formed slurry or solution at moderate temperatures, usually about room temperature, and the resulting mixture stirred for a number of hours or days. At the end of this time, the mixture or solution is drenched with water, and the crude, water insoluble product isolated and purified.

A variety of modifications may be used in carrying out the above process. For example, the nitro or dinitro compound may be added to a solution of the base in methanol or aqueous methanol, and then tetranitromethane added. Another modification involves the addition of a solution of the base in water, methanol, or aqueous methanol to a solution of tetranitromethane and the nitro or dinitro compound in methanol or aqueous methanol. For nitrating the 1,1-dinitro compounds, the use of sodium hydroxide as the base has been found to give preferred results. For nitrating the 1-nitro compounds, however, it was found desirable to use the stronger base, sodium methylate.

The crude products usually consist of mixtures of unchanged starting materials and desired products. In general, unchanged tetranitromethane may be distilled from the crude products at reduced pressure and moderately low temperatures. Care should be taken not to overheat these crude mixtures, as they are usually relatively thermally unstable. In the case of the nitrations of 1,1-dinitro compounds, a major part of the unchanged 1,1-dinitro compound may be removed by various treatments with bases; for example, by stirring the crude mixture with a large excess of sodium bicarbonate dissolved in water, or, by precipitation as the potassium salt from diethyl ether. Removal of the rest of the unchanged 1,1-dinitro compound may be accomplished by chromatographic adsorption on an activated alumina or a silicic acid column. The dinitro compound is retained in a yellow band near the top of the column, and the desired trinitro product is eluted through the column. Final purification may be effected by distillation, sublimation, or recrystallization, depending upon the physical properties of the product.

In the case of the nitrations of 1-nitro compounds, the desired products, 1,1-dinitro compounds, may be separated from mixtures as their salts, as, for example, precipitation as their potassium salts from ether or alcohol, or, they may be separated chromatographically, being adsorbed on activated alumina or silicic acid columns.

To more fully explain the methods of the present invention, several examples are included below as illustrative of the invention but not limiting thereof.

EXAMPLE 1

*Preparation of 1,1,1-trinitropropane*

A solution of 0.20 M (26.8 g.) of 1,1-dinitropropane in 200 ml. of methyl alcohol was placed in a 500 ml. Erlenmeyer flask fitted with an inside thermometer and an electrically-driven stirrer. To this stirred solution was added dropwise, over a ten minute period, a solution of 0.20 M (8.0 g.) of sodium hydroxide in 50 ml. of water. During the addition of the hydroxide solution, the temperature within the flask was maintained at 10–25° C. To the resulting yellow solution was added 0.20 M (39.2 g.) of tetranitromethane in one minute. The resulting orange-red colored solution was allowed to stand at room temperature for two days, and then drenched with 1250 ml. of water. The insoluble oil which separated was extracted with 3 x 100 ml. of methylene chloride. The extract was washed with 4 x 50 ml. of saturated aqueous sodium chloride solution and then dried over sodium sulfate.

The solvent was removed at reduced pressure. The resulting residual oil was kept at room temperature/0.35 mm. for 4 hours to remove most of the unreacted tetranitromethane. The residual oil was stirred vigorously with a solution of 12 g. of sodium bicarbonate in 150 ml. of water for 6 hours at room temperature. The insoluble oil from this treatment was extracted with methylene chloride to give a liquid which still contained some unchanged 1,1-dinitropropane.

This material was dissolved in 800 ml. of petroleum ether (30–60° C.) and the solution passed through a 2 cm. x 35 cm. column of activated alumina. The acidic impurities were retained in a bright yellow band 8 cm. in length at the top of the column. Elution with 800 ml. of petroleum ether (30–60° C.) did not shift the position of this band to any great degree. Removal of the solvent from the combined eluates at reduced pressure left 12.1 g. of a non-acidic, pale yellow oil. Distillation at room temperature/25 mm. in a Hickman still gave 11.5 g. of colorless 1,1,1-trinitropropane, corresponding to a yield of 32% of theory. This product had the following physical constants: $d^{22°}=1.3938$; $n_D^{22°}=1.4432$.

EXAMPLE 2

*Preparation of 1-phenyl-3,3-dinitropropane*

(a) A solution of 0.040 M (6.60 g.) of 1-phenyl-3-nitropropane in 20 ml. of methyl alcohol was placed in a 100 ml. Erlenmeyer flask fitted with an inside thermometer and magnetic stirring device. To this stirred solution was added dropwise a solution of 0.040 M (2.27 g.) of sodium methylate in 20 ml. of methyl alcohol. The temperature within the flask was maintained at 10–25° C. during the addition of the basic solution. With continued stirring, 0.040 M (7.84 g.) of tetranitromethane was added dropwise. The temperature within the flask was maintained at 20–25° C. during this addition. The resulting orange solution was kept at room temperature for 24 hours, at the end of which time a considerable amount of precipitate had formed. The mixture was then drenched with water, and the insoluble oil which separated was extracted with methylene chloride. Removal of the solvent and unreacted tetranitromethane at 35° C./0.2 mm. left an acidic oil. This material was dissolved in 20 ml. of ethyl alcohol and the solution treated with an excess of methanolic potassium hydroxide. After chilling, the yellow potassium salt which separated was filtered off, dissolved in water, and the resulting yellow solution acidified with acetic acid. A colorless oil separated which, on chilling and scratching, slowly crystallized. The weight of the white, crystalline 1-phenyl-3,3-dinitropropane was 1.40 g., corresponding to a yield of 16.7% of theory. Its melting point was 34–36° C. A small sample, recrystallized from benzene-petroleum ether (90–100° C.) in a ratio by volume of 2 to 25, respectively, had a melting point of 37.5–38.5° C.

(b) Experiment (a) was repeated, except that twice as much sodium methylate, and 1.5 times as much tetranitromethane were used. The yield of 1-phenyl-3,3-dinitropropane was 2.65 g., or 31.6% of theory.

EXAMPLE 3

Preparation of 1-phenyl-3,3,3-trinitropropane (a) A solution of 0.100 M (21.00 g.) of 1-phenyl-3,3-dinitropropane in 100 ml. of methyl alcohol was placed in a 250 ml. Erlenmeyer flask equipped with a magnetic stirring device. To this stirred solution was added dropwise 29.0 ml. of a 3.450 N aqueous sodium hydroxide solution at such a rate that the temperature within the flask was maintained at 20–30° C. Some yellow sodium salt separated. To this stirred slurry was added rapidly 0.100 M (19.60 g.) of tetranitromethane. The color of the mixture became deep orange immediately, and after stirring for 1½ hours at room temperature, the yellow sodium salt had all dissolved in a deep orange solution. Stirring was continued for 24 hours at room temperature, during which time a considerable amount of heavy oil had separated, and the color of the supernatent liquor had changed back to yellow. The mixture was drenched with water, and the insoluble oil extracted with methylene chloride. The extract was washed with water and dried over sodium sulfate. The solvent was removed at reduced pressure, and the unchanged tetranitromethane was removed by keeping the residual oil at 40° C./0.2 mm. for two hours. The material left after this treatment was dissolved in 300 ml. of petroleum ether (30–60° C.) and chilled at −10° C. until no further separation of crystals occurred. These crystals consisted of nearly pure unchanged 1-phenyl-3,3-dinitropropane, and the desired product was left almost quantitatively in solution along with some 1-phenyl-3,3-dinitropropane and some unidentified impurities. The mother liquor was decanted, and the crystals washed with 20 ml. more of petroleum ether (30–60° C.) at −10° C. and then filtered off. This filtrate was combined with the mother liquor of crystallization. After the volume of this solution had been reduced to about one-half under reduced pressure, it was passed through a 2 cm. x 36 cm. silicic acid column. A pale yellow band 16 cm. long was developed at the top of the column. The column was eluted with a 10% solution by volume of methylene chloride in petroleum ether (30–60° C.) until the pale yellow band had moved down just to the bottom of the column. Removal of the solvent from the combined eluates left 7.14 g. of white, crystalline, non-acidic 1-phenyl-3,3,3-trinitropropane, corresponding to a yield of 28% of theory; melting point 35–36° C.

(b) The same procedure described in experiment (a) was repeated, except that a 100% excess of tetranitromethane was used. The yield of 1-phenyl-3,3,3-trinitropropane was 32.6% of theory, based on 1-phenyl-3,3-dinitropropane.

While the invention has been illustrated by the preparation of three compounds it is by no means limited thereto. For example any nitroalkane having one or two nitro groups on a terminal carbon may be further nitrated by the process. By "nitroalkanes" is meant also substituted nitroalkanes, for example, nitroalkanes having substituent methyl groups in the chain, such as, 2-methyl-1,1,1-trinitropropane, 3-methyl-1,1,1-trinitrobutane and 2,2-dimethyl-1,1,1-trinitropropane, the latter compounds having been prepared by the above process. The term "nitroalkanes" includes other aryl substituents than phenyl in the alkyl chain. Obviously, other alkali metal compounds than those of sodium may be used for the strongly basic compound and other alcohols than methyl, such as other alkane alcohols, may be used for the alcoholic medium.

It will be clear from the foregoing typical examples that the present method is a valuable means for preparing polynitro compounds of the type set forth above, and in particular, for preparing the new compounds 1,1,1-trinitroalkanes. These compounds are useful as chemical intermediates, as fuel additives, and as components of propellent mixtures.

Obviously many modifications and variations of the present invention are possible in the light of the above teachings. It is therefore to be understood that within the scope of the appended claims the invention may be practiced otherwise than as specifically described.

What is claimed is:

1. The method of further nitrating terminal nitromethyl groups of lower nitroalkanes which comprises reacting the lower nitroalkanes with tetranitromethane in methyl alcohol medium in the presence of a strongly basic alkali metal compound selected from the group consisting of sodium hydroxide and sodium methylate.

2. The method of claim 1 in which the medium is aqueous methyl alcohol.

3. The method of preparing lower 1,1-dinitroalkanes, which comprises, reacting a lower 1-nitroalkane with tetranitromethane in a medium of methanol in the presence of a strongly basic alkali metal compound selected from the group consisting of sodium hydroxide and sodium methylate.

4. The method of claim 3 in which the medium is aqueous methanol.

5. The method of preparing lower 1,1,1-trinitroalkanes, which comprises, reacting a lower 1,1-dinitroalkane with tetranitromethane in a medium of methanol in the presence of a strongly basic alkali metal compound selected from the group consisting of sodium hydroxide and sodium methylate.

6. The method of claim 5 in which the medium is aqueous methanol.

7. The method of preparing compounds of the type formula

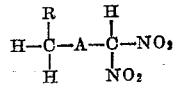

wherein R is a member from the group consisting of hydrogen and aryl and A is a lower alkylene radical, which comprises reacting a compound of the type formula

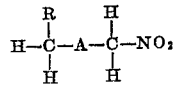

wherein R is a member from the group consisting of hydrogen and aryl and A is a lower alkylene radical, with tetranitromethane in a medium of methanol in the presence of a strongly basic alkali metal compound from the group consisting of sodium hydroxide and sodium methylate.

8. The method of claim 7 in which the strongly basic alkali metal compound is sodium methylate.

9. The method of claim 7 in which the medium is aqueous methanol.

10. The method of claim 9 in which the strongly basic alkali metal compound is sodium methylate.

11. The method of preparing compounds of the type formula

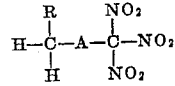

wherein R is a member from the group consisting of hydrogen and aryl and A is a lower alkylene radical, which comprises reacting a compound of the type formula

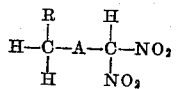

wherein R is a member from the group consisting of hydrogen and aryl and A is a lower alkylene radical, with tetranitromethane in a medium of methanol in the presence of a strongly basic alkali metal compound from the group consisting of sodium hydroxide and sodium methylate.

12. The method of claim 11 in which the medium is aqueous methanol.

13. The method of claim 11 in which the strongly basic alkali metal compound is sodium hydroxide.

References Cited in the file of this patent

UNITED STATES PATENTS 2,590,009     Hannum  ------------- Mar. 18, 1952